United States Patent
Gelman et al.

(10) Patent No.: US 11,847,410 B2
(45) Date of Patent: *Dec. 19, 2023

(54) VIEWING FILE MODIFICATIONS

(71) Applicant: CFPH, LLC, New York, NY (US)

(72) Inventors: Geoffrey M. Gelman, Brooklyn, NY (US); Dean P. Alderucci, Westport, CT (US); Gregory P. Manning, New York, NY (US); Michael D. Brinton, Washington, DC (US)

(73) Assignee: CFPH, LLC, New York, NY (US)

(*) Notice: Subject to any disclaimer, the term of this patent is extended or adjusted under 35 U.S.C. 154(b) by 81 days.

This patent is subject to a terminal disclaimer.

(21) Appl. No.: 17/385,097

(22) Filed: Jul. 26, 2021

(65) Prior Publication Data

US 2021/0390253 A1  Dec. 16, 2021

Related U.S. Application Data

(63) Continuation of application No. 14/246,338, filed on Apr. 7, 2014, now Pat. No. 11,074,404, which is a continuation of application No. 12/542,083, filed on Aug. 17, 2009, now Pat. No. 8,694,881, which is a continuation of application No. 11/625,508, filed on Jan. 22, 2007, now Pat. No. 8,205,150.

(51) Int. Cl.
*G06F 40/197* (2020.01)
*G06F 3/0481* (2022.01)
*G06F 40/194* (2020.01)

(52) U.S. Cl.
CPC .......... *G06F 40/197* (2020.01); *G06F 3/0481* (2013.01); *G06F 40/194* (2020.01)

(58) Field of Classification Search
None
See application file for complete search history.

(56) References Cited

U.S. PATENT DOCUMENTS

| | | | | |
|---|---|---|---|---|
| 5,966,512 A * | 10/1999 | Bates | ..................... | G06F 40/197 709/204 |
| 6,065,026 A * | 5/2000 | Cornelia | ............... | G06F 40/166 715/204 |
| 6,816,984 B1 * | 11/2004 | Snyder | ................ | G06F 11/1438 714/38.14 |
| 7,788,237 B2 * | 8/2010 | Voronov | ............... | G06F 40/166 715/229 |
| 2003/0001891 A1 * | 1/2003 | Keohane | ................ | G06Q 10/10 715/754 |
| 2003/0088831 A1 * | 5/2003 | Bauer | ..................... | G06F 16/93 707/E17.008 |
| 2003/0105912 A1 * | 6/2003 | Noren | .................. | G06F 11/1448 714/E11.121 |
| 2003/0222919 A1 * | 12/2003 | Brendle | ................ | G06F 3/0481 715/781 |
| 2004/0019846 A1 * | 1/2004 | Castellani | .............. | G06Q 10/10 715/229 |

(Continued)

OTHER PUBLICATIONS

Tam, James, and Saul Greenberg. "A framework for asynchronous change awareness in collaborative documents and workspaces." International Journal of Human-Computer Studies 64, No. 7 (2006): 583-598. (Year: 2006).*

*Primary Examiner* — Frank D Mills

(57) ABSTRACT

Upon closing and/or saving a file, a user may view changes made to the file.

16 Claims, 6 Drawing Sheets

(56) References Cited

U.S. PATENT DOCUMENTS

| | | | |
|---|---|---|---|
| 2004/0123145 A1* | 6/2004 | Baffes | H04L 63/20 726/1 |
| 2004/0205653 A1* | 10/2004 | Hadfield | G06Q 10/10 715/255 |
| 2005/0010863 A1* | 1/2005 | Zernik | G06F 40/131 715/229 |
| 2005/0081121 A1* | 4/2005 | Wedel | H04L 67/1095 714/48 |
| 2007/0156998 A1* | 7/2007 | Gorobets | G06F 12/0246 711/170 |
| 2013/0212151 A1* | 8/2013 | Herbach | G06F 16/93 709/203 |
| 2014/0250360 A1* | 9/2014 | Jiang | G06F 40/197 715/229 |

* cited by examiner

VIEWING FILE MODIFICATIONS

CROSS REFERENCE TO RELATED APPLICATION

This application is a continuation of U.S. patent application Ser. No. 14/246,338 filed Apr. 7, 2014, which is a continuation of U.S. patent application Ser. No. 12/542,083 (now U.S. Pat. No. 8,694,881) filed Aug. 17, 2009 by Dean P. Alderucci, Michael D. Brinton, Geoffrey M. Gelman, and Gregory P Manning, which is a continuation of U.S. patent application Ser. No. 11/625,508 (now U.S. Pat. No. 8,205,150), filed Jan. 22, 2007 by Dean P. Alderucci, Michael D. Brinton, Geoffrey M. Gelman, and Gregory P. Manning, each of which is hereby incorporated by reference herein in its entirety.

DETAILED DESCRIPTION

Figure 1:
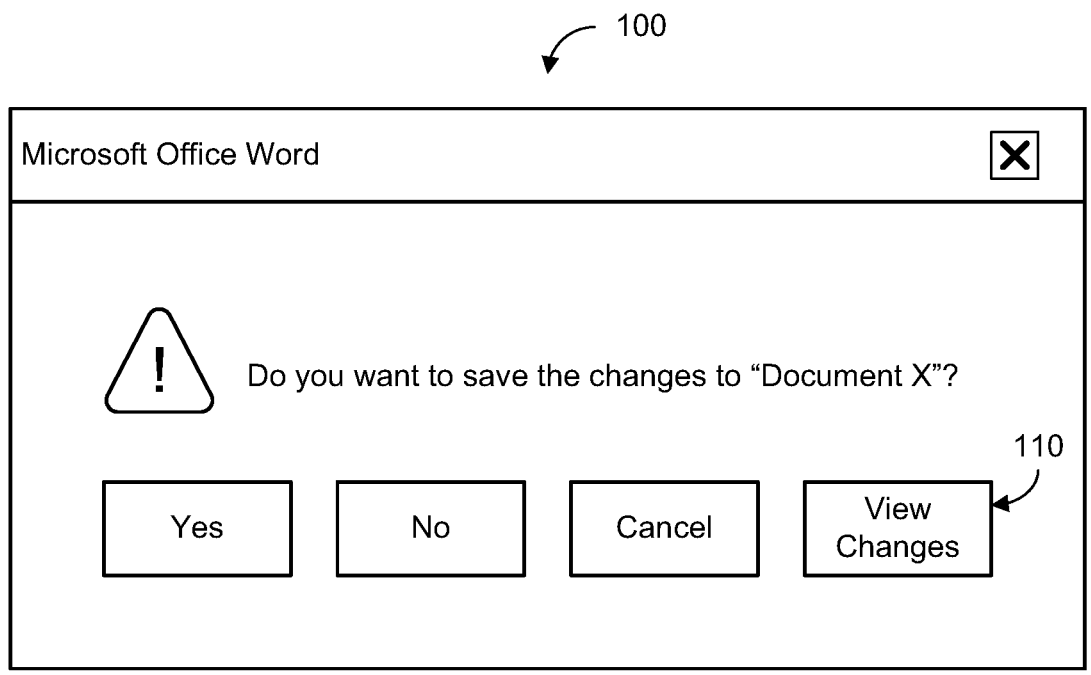
FIG. 1 shows a prompt according to some embodiments.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Some Embodiments

Prompt

As used herein, a prompt may include a message which is presented to a user. The message may be a question, a warning, an item of information, or any other message. An example of a prompt is a message asking if the user wishes to save changes made to a document. A prompt may include user options for responding. For example, a prompt may include buttons that a user may click in order to indicate responses to the prompt, such as "yes" or "no". A prompt may include a window, box, dialog box, are any other area where a message may be displayed to the user. A prompt may be triggered, launched, or initiated by a program (e.g., by Microsoft Word), by an operating system, or by any other software. In various embodiments, buttons on a prompt may themselves include messages. For example, a button on a prompt may read "view changes", which may serve as a message to the user telling the user that the user can view alterations to a document by pressing the button.

Document

As used herein, the term "document" may include a set of data. The data may be stored as a group or unit. The data may be stored, in computer memory, on a computer storage medium (e.g., on a compact disc (CD); e.g., on a digital versatile disc (DVD); e.g., on a floppy disk; e.g., on a universal serial bus (USB) drive; e.g., on flash memory), on a server, on a network, or in any other location. The data making up a document may be stored in one or more locations. For example, a document may include a first set of data that is stored on a first computer and a second set of data that is stored on a second computer. A document may be stored in one or more remote locations. For example, a document may include a first set of data that is stored on a first computer in Australia, and a second set of data that is stored on a second computer in Argentina.

A document may include data stored in any suitable form. A document may include data stored as bits, data stored as bytes, data stored as quantum bits, data stored as characters, data stored in digital form, data stored in analog form, and data stored in any other form. A document may include data on a printed page, such as words on a printed page. A document may include data stored in compressed form. A document may include data stored in encrypted form.

In various embodiments, a set of data may be part of two or more documents. For example, a single image may be used in more than one document. The image may be stored in only a single location. As another example, set of data may form a document in its own right, while also being a subset of a larger set of data, the larger set of data also forming a document. For instance a first set of data may represent a modified version of a second set of data, yet may be stored in association with the second set of data as part of a larger set of data. The first set of data may thereby make up one document. The second set of data may make up another document. The union of the first set of data and the second set of data may make up a third document.

In various embodiments, data that makes up a document may be delineated from data that does not make up the document. As used herein, a "document tag" may include data which defines what data is in a particular document. For example, a document tag may specify a range of memory addresses in a computer memory such that all memory addresses falling within the specified range are understood to contain data that is part of the same document.

A document tag may or may not itself form part of a document, in various embodiments. In various embodiments, a document tag may include data other than data that defines what data is in a particular document. For example, a document tag may include (a) data that defines what data is in a particular document, and (b) data that indicates what program should be used for interpreting the data in the document (e.g., Microsoft Excel, e.g., Microsoft Excel).

Copies of a Document

In various embodiments, there may exist a copy of a document. If a first document comprises a first set of data, a copy of the first document may comprise a second set of data. The second set of data may be stored in a separate location that that of the first set of data. For example, the first set of data may be stored in the random access memory of a computer, while the second set of data may be stored on the hard drive of the computer. Although the second set of data may be stored in a different location from the location of the first set of data, the second set of data may be similar to the first set of data. For example, the first set of data and the second set of data may represent the exact same text characters. As another example, the first set of data and the second set of data may include the same sequence of bits. The second set of data may make up a second document. In various embodiments, a third document may be made up of the first document and the second document.

In various embodiments, a first document and a second document which is a copy of the first document may comprise the same set of data. For example, the data making up a first document may be stored in the same memory locations as are the data making up a second document. In various embodiments, a first document and a second document which is a copy of the first document may comprise overlapping sets of data. For example, a first document may comprise a first and second set of data, while a copy of the first document may comprise a second set of data and a third set of data.

Versions of a Document

In various embodiments, there may exist a version of a document. If a document comprises a first set of data, a version of the document may comprise a second set of data. The second set of data may make up a second document. The second set of data may be stored in a separate location that that of the first set of data. For example, the first set of data may be stored in the random access memory of a computer, while the second set of data may be stored on the hard drive of the computer. Although the second set of data may be stored in a different location from the location of the first set of data, the second set of data may be similar to the first set of data. For example, the second set of data may represent a number of characters that are also represented by the first set of data.

In various embodiments, a first document and a second document which is a version of the first document may comprise overlapping sets of data. For example, a first document may comprise first and second sets of data, while a second document may comprise first and third sets of data.

In various embodiments, a version of a first document may be a second document which was created as a copy of the first document at some prior point in time. For example, a user might be using a word processing program. The user might save a copy of the document he is working on. He may then continue to add text to the document. The saved copy may thus represent a version (e.g., a prior version) of the document that the user is presently working on.

Data Displayed Versus Data Stored

A document may include data as it is stored as well as data as it is displayed. For example, a document may include a set of text characters that are displayed for human perception (e.g., on a computer monitor) as well as a binary representation of the same text characters. As another example, a document (e.g., an image) may include a set of colored pixel elements as well a binary representation of the colors to be displayed at different pixel elements.

Various embodiments contemplate a file, document, or other set of data that can be altered. The alterations may occur using a program, such as a word processing program, a spreadsheet program, a drawing program, a database program, an editing program, a program for composing emails, an image processing program, a program for composing and arranging music, a program for sharing documents, or any other program. Exemplary documents include Microsoft Word documents, WordPerfect documents, Microsoft Excel documents, and so on. Exemplary programs include Microsoft Word, Microsoft Excel, Microsoft PowerPoint, Microsoft Access, Microsoft Visio, Microsoft Outlook, and Twiki.

Alterations to a document may include: (a) adding or removing text; (b) adding or removing blank characters, such as spaces, carriage returns, tabs, and other blank characters; (c) adding or removing tables; (d) changing formatting, such as margins, fonts, text sizes, line spacing, highlighting, outline numbering, indentation, or any other formatting; (e) changing colors, such as the fill colors in shapes, the colors of cells in spreadsheets, the colors of cells in tables, the color of text, or any other colors; (f) adding or removing shapes (e.g., circles, rectangles, triangles, lines, arrows, and other shapes), including shapes used in drawing programs, including shapes used in slide presentations, including shapes used in word processing documents; (g) adding or removing charts, tables, graphs, pictures, symbols, or other graphics; (h) changing the position of text; (i) changing the position of shapes; (j) changing the position of charts, tables, graphs, pictures, symbols, or other graphics; (k) changing the size of shapes; (l) changing the size of charts, tables, graphs, pictures, symbols, or other graphics; (m) changing the orientation of shapes, charts, tables, graphs, pictures, symbols, or other graphics; and any other alterations.

As used herein, the term "save" may include a process of creating a copy or a version of a document. For example, a computer may save a document which comprises a first set of data by creating a second set of data which is the same as the first set of data but which is stored in a different location than is the first set of data. In various embodiments, a computer may save a document which comprises a first set of data stored in random access memory by creating a second set of data which is stored on the hard drive of the computer. In various embodiments, a computer may save a copy of a document which comprises a first set of data stored in a relatively more temporary area by creating a second set of data which is stored in a relatively more permanent area. In various embodiments, two versions of a document may exist. One version may comprise a more recently altered version, such as a version to which text has been recently added. In various embodiments, a save operation may include destroying the older version of a document and replacing it with the recently altered version. As will be appreciated, there may be any number of implementations the process of saving, and no particular description of saving described herein is intended to be limiting.

Opening and Editing a Document

In various embodiments, a user may open a document in order to make alterations to the document. The user may indicate a desire to open a document, for example, by using a computer mouse to double-clock on an icon representing the document, by typing the name of the document at a command line, by selecting the name of the document from a within menu system (e.g., using the "File" menu "Open" option in Microsoft Word), or using any other method of opening a document.

The document selected for opening may include a first set of data stored at a first location. For example, the document selected for opening may include a first set of data that is stored on the hard drive of a computer. Once the document is opened, the first set of data may remain stored at the same location. However, a copy of the document may be created. The copy of the document may include a second set of data that is stored at a second location. The second set of data may be initially the same as the first set of data (e.g., the second set of data may comprise the same sequence of bits as does the first set of data; e.g., the second set of data may represent the same sequence of characters as does the first set of data). The second location may reside on an accessible medium, such as on random access memory. Thus, after a document has been opened, there may exist two versions of the document. One version may be the document as it was when it was opened. This version may be stored on the hard drive of a computer. Another version may be the document as it is currently being viewed and edited by a user. The second version may be stored in random access memory, or in some other rapidly accessible medium. In various embodiments, these two versions of the document may be considered to be part of the same document.

Once a document has been opened, a first version may reside in a first location, while a second version may reside in a second location. The first version may represent the document at the time it was opened. A user may then proceed to alter the second version. A user may alter the second version by providing instructions to the computer. The user may provide instructions through such actions as typing, moving and clicking a mouse, or otherwise providing computer inputs or other inputs. Note that the act of pressing a key or clicking a mouse may itself be an instruction. A user need not necessarily spell out an instruction in order to alter a version of a document. As desired, a user may "save" the altered second version. When the user saves these alterations, the data making up the second version may be copied to another storage location, such as to the hard drive of the computer, thus creating a third version of the document. The first version of the document may be erased. In some embodiments, the data for the third version of the document may simply by used to overwrite the data for the first version of the document. Thus, in various embodiments, the third version of the document may replace the first version of the document. In various embodiments, data representing a difference between the altered second version and the first version of the document may be stored. Thus, the second version may be reproducible using the stored first version of the document together with the data representing changes. It will be appreciated that there are many other possible ways for implementing a "save" operation.

After a "save" operation, two versions of a document may again exist. The version now stored in a first location (e.g., in a relatively more permanent location such as on a computer hard drive) may represent the originally opened version plus any alterations made to that version up until the time of the save operation. The version now stored in a second location (e.g., in a relatively more accessible location such as in random access memory) may represent the version stored in the first location plus any alterations made since the time of the most recent save operation. At the time of a save operation, both versions of the document may be identical, since a user may not have made any alterations yet to the version stored in the second location. Thus, in various embodiments, after a save operation, a user may "close" a document. When a user closes a document, one of the two versions of the document in existence may be destroyed. For example, a version of the document comprising data stored in a relatively accessible location (e.g., in random access memory) may be destroyed. The destruction of the version may not result in any loss of information, however, since an identical version of the document may remain stored in a relatively more permanent location (e.g., on a computer hard drive).

Close operations may be initiated in a number of ways. A user may use a mouse to click a specially marked button that is associated with a document. For example, a user may click an "x" in the top right hand corner of a screen which is displaying the contents of a document in order to close the document. As another example, a user may access a menu of a program being used to view and alter the document. Such programs may include Microsoft Word and Microsoft Excel, for example. Within the menu, a user may select a "close" option. As another example, a user may close an entire program (e.g., Microsoft Word) which is being used to view and alter a document. In closing the program, the user may be indirectly closing the document. As another example, a user may shut down a computer which is being used to view and alter a document. The user may thereby be indirectly closing the document. It will be appreciated that close operations may be initiated in various other ways. In various embodiments, close operations may happen without the request of a user. For example, a second program may force the closure of a first program that is being used to view and alter a document. As another example, a computer may automatically initiate a shut-down.

A save operation need not only occur at the behest of a user. A save operation may occur automatically. For example, a computer may be operative to automatically perform a save operation on a document every 10 minutes. Automatic saving may help to avoid the loss of alterations made by a user should a loss of power occur (e.g., thus destroying a version of a document in the random access memory of a computer).

Discarding a Document

As used herein, discarding a document may include destroying data making up the document, allowing data which makes up the document to become overwritten (e.g., with data describing another document), allowing data making up the document to be lost, removing reference to the location of the data making up the document (e.g., a document may be effectively discarded if the computer storing the document no longer has any indication of where in computer memory the document is stored), removing access to the data making up the document, or any other way of removing a document. It will be understood that a version or a copy of a document may be discarded in a similar fashion.

In various embodiments described herein, when a user decides not to save a version of a document, the user may be effectively discarding that version of the document. In various embodiments, when a user decides to save a version of a document, the user may be effectively discarding the previously saved version of the document. For example, saving a second version of a document may cause a first version of the document to be overwritten.

Figure 6:
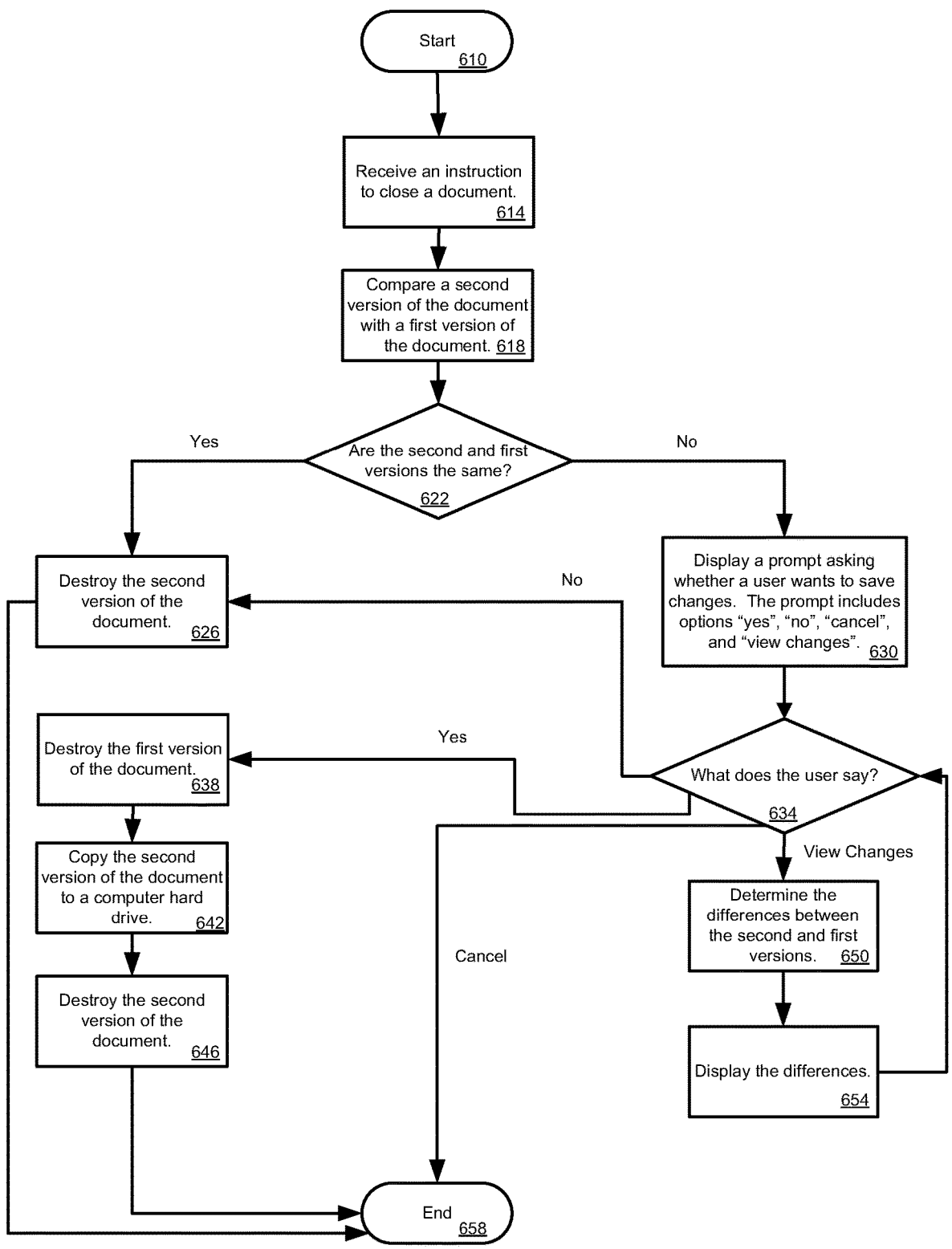
FIG. 6 shows a process according to some embodiments.

Reference is now made to FIG. 6, which describes processes according to various embodiments. Processes described in FIG. 6 may be performed by any suitable device, such as by a computer, a series of computers, a server, a computer and a server, a mobile computing device, and any other capable device.

A user may be in the midst of viewing or altering a document. At step 614, an instruction to close the document may be received. The instruction may be given by the user, may be given automatically (e.g., by a program running in the background), or may be given by any other means. At step 618, a comparison may be performed between a first version of the document and a second version of the document. The second version of the document may represent a version stored in a readily accessible medium (e.g., in random access memory) and also may represent a version that is currently displayed for the user. The first version of the document may represent a version stored in a more permanent medium, such as on a computer hard drive. Through the process of comparison, it may be determined whether there are differences between the first version of the document and the second version of the document.

The first version and the second version may be compared in a number of ways. In various embodiments, a first set of data making up the first version of the document is understood to have a particular order. For example, the data is ordered according to the memory addresses in which the data is stored. Thus, for example, data stored in addresses with low numbers is understood to come before data stored in memory addresses with higher numbers. Similarly, a second set of data making up the second version of the document is understood to have a particular order. The first and second versions of the documents may thus be compared by proceeding element by element (e.g., bit by bit; e.g., byte by byte; e.g., character by character; e.g., pixel by pixel) through the first set of data and through the second set of data. The first data element of the first set of data may be compared with the first data element of the second set of data. Then the second data element of the first set of data may be compared with the second data element of the second set of data. Then the third data element of the first set of data may be compared with the third data element of the second set of data. If, after all data elements are considered, there are no differences between the first set of data and the second set of data, then the versions of the document may be considered to be the same. However, if there are differences between the first set of data and the second set of data, such differences may be recorded. For example, where two compared data elements are different, a copy of both the first and second data elements may be stored in a separate location in computer memory. Further, the position of such data elements within their respective data sets may be noted. This may allow for a future listing of all differences between the first version of the document and the second version of the document, as well as for an indication of the position within each documents (e.g., the page number; e.g., the line number; e.g., the cell reference; e.g., the character number; e.g., the pixel coordinates) that the differences occur.

In various embodiments, existing functions may be used to compare documents. For example, functions native to Microsoft Word may be used for comparing documents.

In various embodiments, an explicit comparison need not be performed between the first version and the second version. In various embodiments, the second version of the document may comprise the same set of data that makes up the first version of the document, plus a second set of data describing differences between the second version of the document and the first version of the document. This may be an efficient way to store the second version, for example. Thus, a comparison between the first version and the second version of the document may require reference only to the second set of data. By reference to the second set of data, the existence of any differences may be deduced. Further, the exact nature of such differences may be deduced. If the second set of data is the empty set, then it may be assumed that the first version of the document and the second version of the document are the same.

At step 622, it may be determined whether the first version and the second version of the document are the same. If the two versions are the same, then the second version may be safely destroyed without loss of information. Thus, at step 626, the second version of the document is destroyed. In various embodiments, the second version of the document need not be explicitly destroyed. For example, power may be removed from the memory storing the second version, thus causing the data making up the second version of the document to be lost. As another example, though the second version of the document may not be explicitly destroyed, the computer may allow that the memory locations storing the data of the second version to become overwritten, such as by other programs.

If the first version and the second version are not the same, a prompt may be displayed. Displaying a prompt may correspond with step 630. The prompt may ask the user whether the user wishes to save changes. The prompt may include options for the user to select. Such options may include a "yes" option, a "no" option, a "cancel" option, and a "view changes" option. It will be understood that, in various embodiments, alternative words may be used. For example, the word "affirmative" may be used in place of "yes", the word "negative" in place of no, and the words "never mind" in place of "cancel". Various alternatives to "view changes" may also be listed. Alternatives to the word "view" may include: (a) "view"; (b) "show"; (c) "list"; (d) "enumerate"; (e) "recite"; (f) "describe"; (g) "indicate"; (h) "preview"; (i) "display"; (j) "feature"; (k) "point out"; (l) "specify"; (m) "convey"; and any other suitable alternatives. Alternatives to the word "changes" may include: (a) "changes"; (b) "change" (e.g., if there is only one change); (c) "alterations"; (d) "differences"; (e) "modifications"; (f) "additions"; (h) "subtractions"; (i) "corrections"; (j) "variances"; and any other suitable alternatives. It will be understood that words may be used in the singular or in the plural, in various embodiments (e.g., "change"; e.g., "changes"). It will be understood that more or less than two words may be used to describe an option, that an option may be described by icons, graphics, shading, or other visual indicators, that an option may be described by audio messages (e.g., a voice may prompt a user as to whether a user would like to "save changes", "discard changes", "view changes", or "cancel"), or that an option may be described in any other suitable fashion.

A prompt may include a dialog box, such as those which may be generated in Windows programs using Visual Basic. An example of a prompt according to some embodiments is shown in FIG. 1. As will be appreciated, a prompt may take many other shapes or forms, according to various embodiments.

In various embodiments, options given to a user in conjunction with a prompt may be clickable or otherwise selectable. For example, in FIG. 1, a user may have the ability to bring his mouse pointer over the box labeled "View Changes" 110. By clicking on the box, the user may cause to be displayed an indication of changes or differences between the second version of the document and the first version of the document. In various embodiments, options may be selected by a user in other ways. For example, a user may speak his choice, type a key on a keyboard to indicate his choice, or use any other means of selection.

After the display of the prompt, a user may select the "no" option. In this case, it may be presumed that the user does not wish to save changes (e.g., the differences in the second version of the document versus the first version of the document). Thus, the second version of the document may be destroyed 626, may be allowed to be lost, etc.

After the display of the prompt, a user may select the "yes" option. In this case, it may be presumed that the user does wish to save changes. Thus, the user may not wish to preserve the version of the document which existed prior to the changes, i.e., the first version. Thus, the first version of the document may be destroyed 638. The second version of the document may then be copied to a more permanent storage location, such as to a computer hard drive (as in step 642). In various embodiments, the second version of the document may simply be written over the first version of the document, thus destroying the first version while copying the second version. At step 646, the second version of the document may be destroyed, allowed to be lost, etc. This may occur as a result of the initial request to close the document at step 614. However, though the second version may be destroyed, no information from the second version need be lost since a copy has been made at step 642.

After display of the prompt, a user may select the "cancel" option. In this case, it may be presumed that the user no longer wishes to close the document. In various embodiments, the prompt may be removed.

After display of the prompt, a user may select the "view changes" option. This option may present advantages to the user. The user may not remember if he has intentionally made any changes to the document or not since the creation of the second version. If the user has intentionally made changes, then the user would likely prefer to save those changes. However, if the user has not intentionally made changes (e.g., the user has accidentally hit a few keys and thereby deleted a passage from his document), then user would not likely wish to save changes. If the user does not remember whether or not he has intentionally made changes, then the user may face a dilemma as to whether or not to save the changes. By selecting a "view changes" option and then actually seeing an indication of what changes have been made, the user may be able to make a more informed decision as to whether or not he would like to save the changes.

Once the user has selected the "view changes" option, the differences between the second and first versions of the document may be determined 650. As described herein, such differences may be determined in a number of different ways, in various embodiments. In various embodiments, such differences may already have been determined in earlier steps, such as at step 618 when the second version was compared to the first version.

At step 654, the differences between the second and first versions of the document may be displayed. The differences may be displayed in a number of different formats. The differences may be displayed in visual format, may be presented in audio format, or may be presented in any other fashion. In various embodiments, exact differences are not necessarily displayed. For example, a summary indication of differences may be described. For instance, a description of differences may say, "there has been a paragraph added on page 7". In various embodiments, a side by side visual comparison of two documents is used to highlight differences.

After the differences have been displayed to the user, the user may remain with the option of whether or not to save changes, or whether to "cancel" and thereby reverse his decision to close the document in the first place. Thus, flow may proceed back to 634 where the user's next decision is ascertained. However, since the "view changes" option has already been selected, the option may disappear from the dialog box.

Figure 2:
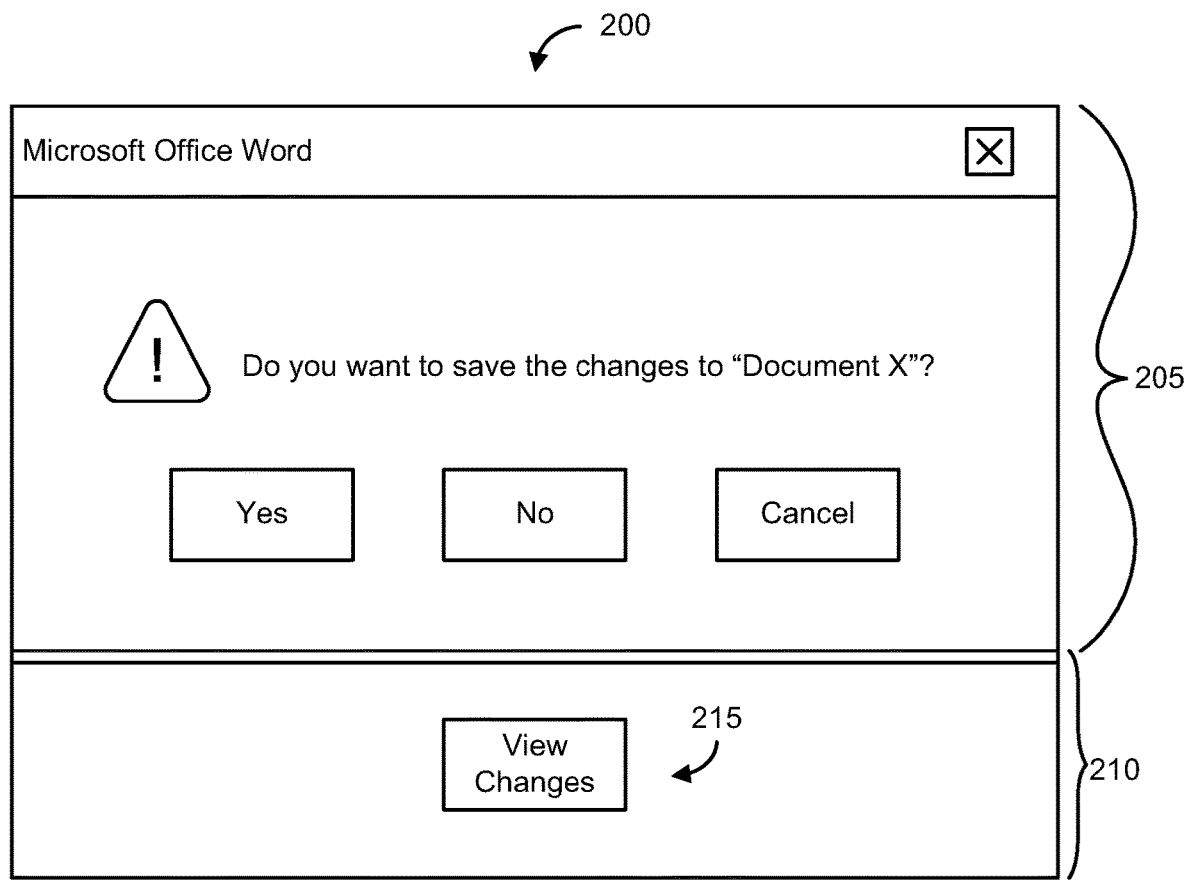
FIG. 2 shows a prompt according to some embodiments.

FIG. 2 shows a prompt 200 according to various embodiments. The top portion of the prompt 205 may represent a typical or default version of a prompt shown when a user has requested to close a document without having saved alterations. The bottom portion of the prompt 210 may represent an additional portion that may be added. The additional portion of the prompt 210 may be added through a modification of the Microsoft Windows operating system, e.g., through a modification to the "save" module that is built into the Microsoft Windows operating system. The additional portion of the prompt may be added using a patch added to the Microsoft Windows operating system, e.g., using additional code that interfaces with an applications programming interface (API) of the Microsoft Windows operating system such as with an API to the "save" module in the Microsoft Windows operating system. As will be appreciated, in various embodiments, many additions or modifications may be made to any default prompt used in conjunction with a save operation. For example, the portion 210 may be instead added at the side of the default portion 205, on top of the default portion 205, separated from the default portion 205, on top of the default portion 205, overlapping with the default portion 205, or in any other location. Further, it will be appreciated that in various embodiments, the portion 210 may be other shapes and sizes, such as being hexagonal in shape. Button 215, when selected by a user, may trigger the display of indications of alterations made to the document being closed.

Figure 3:
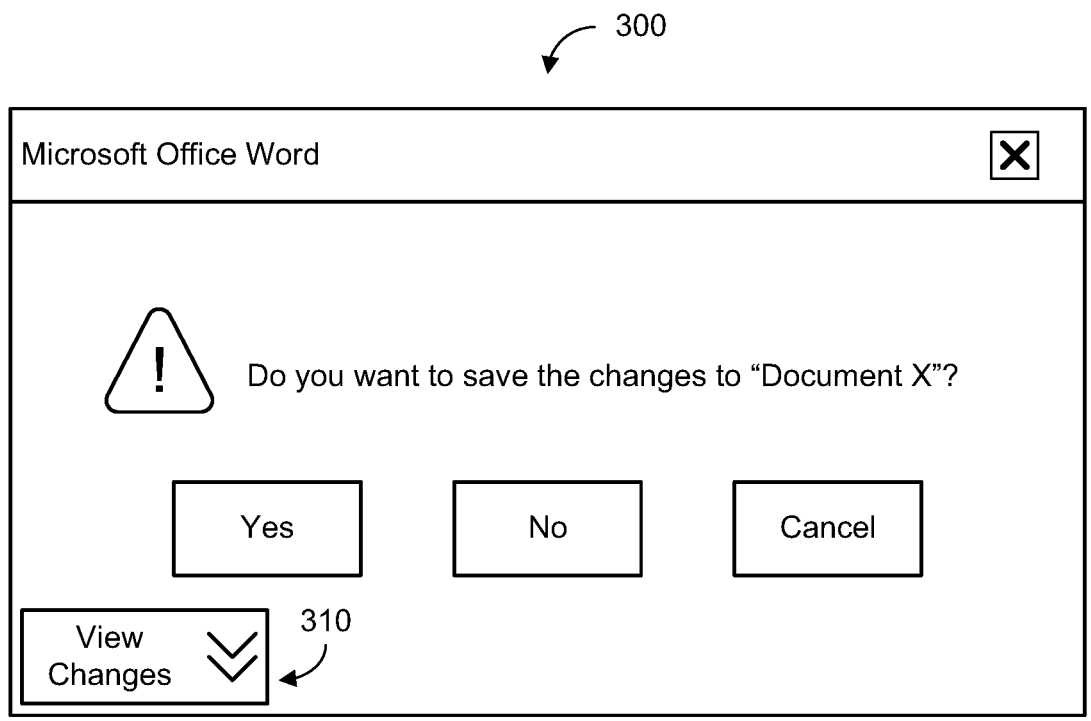
FIG. 3 shows a prompt according to some embodiments.

FIG. 3 shows a prompt 300 according to various embodiments. In response to the prompt, the user has options "yes", "no", "cancel", and "view changes" 310. On button 310, the two downward pointing angle brackets indicate that the user can click the button 310 in order to have the changes revealed below.

Figure 4:
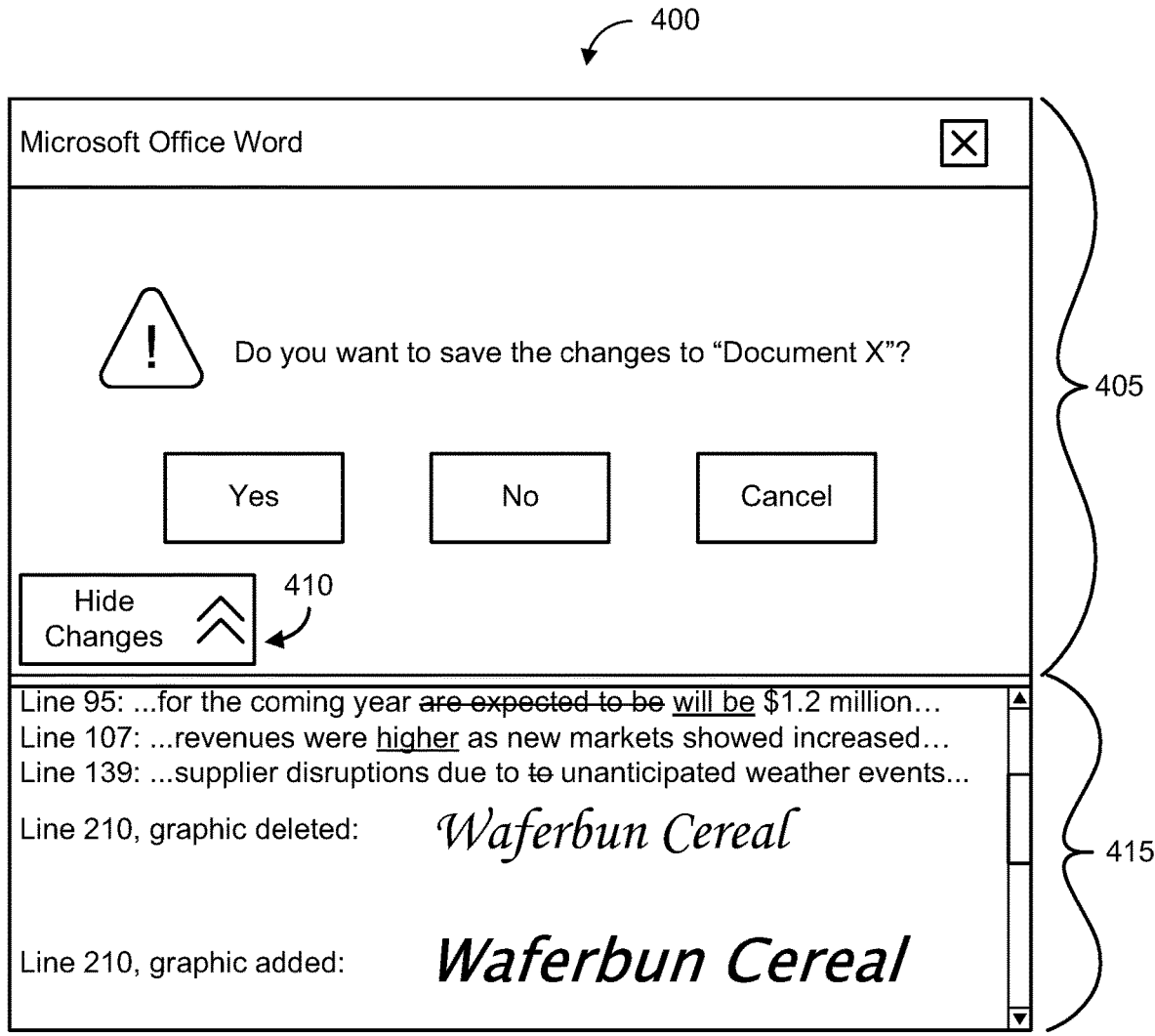
FIG. 4 shows a prompt according to some embodiments.

FIG. 4 shows a prompt 400 which is an expanded version of prompt 300 according to various embodiments. The user has pressed the "view changes" button 310 and now various alterations to the user's document are shown in the portion of prompt 400 labeled with 415. In FIG. 4, additions of text are shown with an underline. For example, "will be" is underlined to show that the text has been added to the document. Deletions of text are shown in strikethrough. For example, "are expected to be" is shown in strikethrough to show that "are expected to be" has been deleted. Line numbers (e.g., "Line 95") have been added for convenience to show the line of the document on which the change has been made. Such line numbers do not necessarily appear in the document itself. The portion of the prompt 415 shows only those lines in the document to which changes have been made. This may allow more convenient viewing of all the changes. Deletions and additions of graphics are also shown. For example, at line 210 in the document, a graphic depicting a logo has been deleted. At the same line, another graphic depicting the same logo has been added. A scroll bar at the right of portion 210 may allow a user to scroll through to see additional alterations if all cannot fit at the same time in portion 415. Also in FIG. 4, the button 310 which had read "view changes" has now become a button 410 which reads "hide changes". By clicking or otherwise selecting the "hide changes" button, a user may cause the portion 415 to disappear.

In various embodiments, portion 415 may allow a user to view an entire document. The portion 415 may allow a user to view both altered and unaltered parts of a document. As will be appreciated, various embodiments contemplate other ways to display the alterations in a document.

Figure 5:
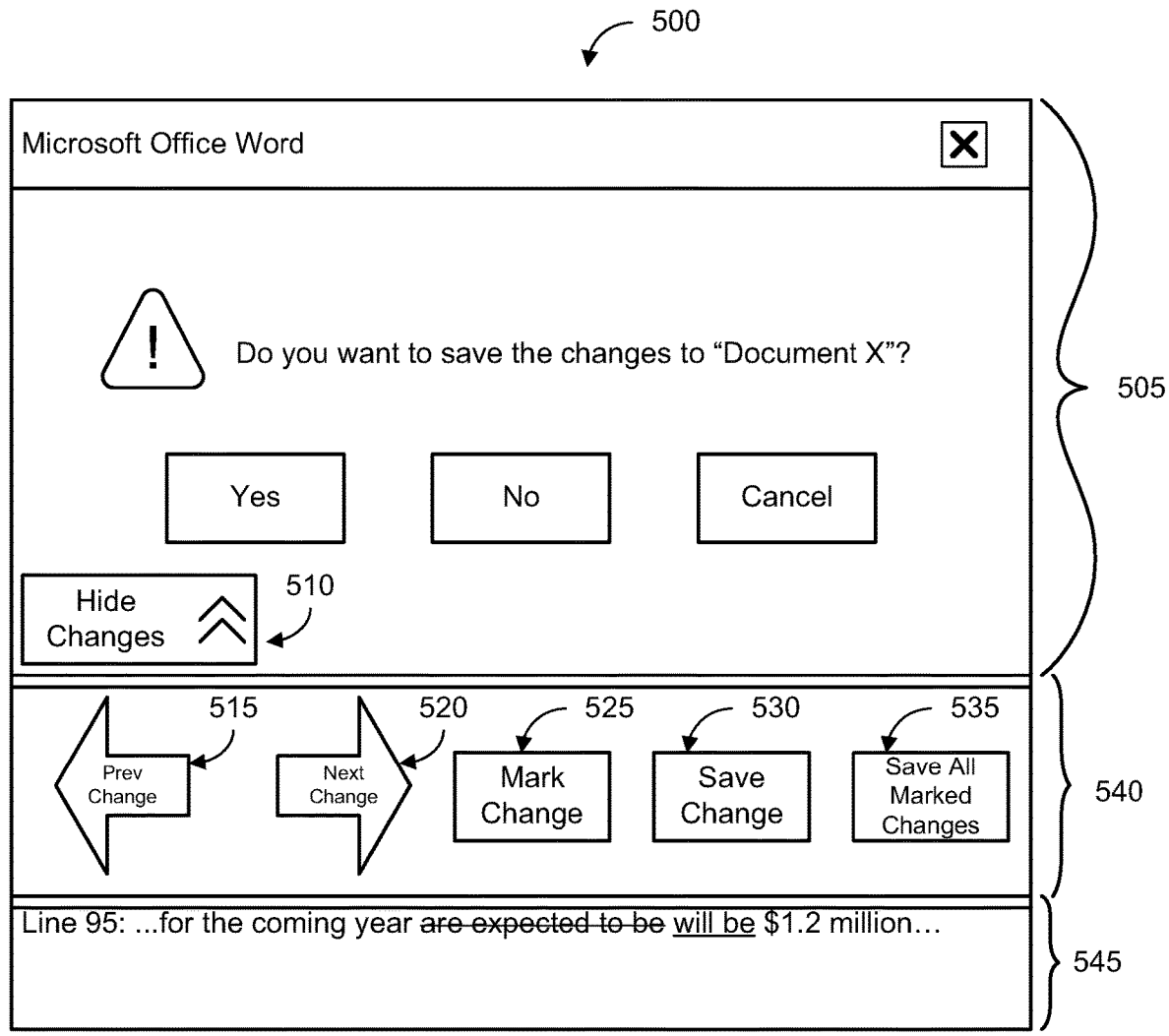
FIG. 5 shows a prompt according to some embodiments.

FIG. 5 shows a prompt 500 according to various embodiments. The prompt includes portions 505, 540, and 545. Portion 545 shows alterations to the user's document. Portion 540 provides various user options in the form of clickable or otherwise selectable buttons. The button labeled "prey change" 515, when clicked, may direct that the prior alteration to be shown. For example, if the user clicks on button 515, an alteration to line 63 of the document may be shown. The button labeled "next change" 520, when clicked, may direct that the next alteration be shown. For example, when a user clicks button 520, an alteration at line 107 in the document may be shown. The button labeled "mark change" 525, when clicked, may direct that alteration or alterations currently shown be noted. The button labeled "save all marked changes" 535, when clicked, may direct that all alterations that had previously been marked (e.g., using button 525) be actually saved. Thus, when button 535 is clicked, a new version of the document may be stored on the computer's hard disk, with the new document incorporating all alterations that had been marked with button 525. The button labeled "save change" 530, when clicked, may direct that the currently visible alteration or alterations (e.g., the alterations currently visible in portion 545) be saved. Thus, for example, when button 530 is clicked, a new version of the document is saved such that the new version incorporates the alteration currently visible in 545.

1. When to display the prompt. A prompt which asks a user whether or not he would like to view changes or alterations made to a document may be shown at various times. The prompt may also include a question asking the user whether or not he would like to save changes made to the document. For example, the prompt may ask the user whether he would like to save changes. Following the question, the prompt may ask the user whether or not he would like to view the changes.

1.1. When someone tries closing the document without saving. A prompt may be shown if a user attempts to close a document without saving. A prompt may be shown if a user attempts to close a version of a document that is different from another version of the document stored on a computer hard drive or on any other relatively long term medium (e.g., on a medium that maintains information even in the absence of power). A prompt may be shown if a user attempts to close a document and the version of the document that the user is currently working on is different from a version of the document that is stored in a relatively long term medium (e.g., on the computer hard drive). A prompt may be shown if a user attempts to close a document and the version of the document that the user is currently working on is different from a saved version of the document. A prompt may be shown if a user attempts to close a document to which changes have been made, without having saved those changes.

1.2. When someone actually wants to save the document. They can be asked if they want to see the changes they are saving. For example, this could be an option under the "file" menu, where "save" usually is. A prompt may be shown if a user indicates a desire to save a document. For example, a user may type the key combination "control+s" in a Microsoft Windows environment, or may click on the "file" menu and the "save" option, e.g., in Microsoft Word. A prompt may thereupon appear asking whether the use would like to view the changes that he will be saving.

1.3. During an automatic backup. A prompt may be shown during a save operation that has been initiated automatically. In various embodiments, a document may be automatically saved. Automatic saving may occur periodically, such as every five minutes, every 10 minutes, or every hour. Automatic saving may serve the purpose of saving alterations to a document without requiring that a user remember to do so, so that fewer alterations will be lost in the event of a power shut down or similar event. When a save operation is automatically initiated, a prompt may be generated asking a user whether he would like to view the alterations being saved. The user may have a predetermined amount of time to respond to the prompt. For example, the user may have 30 seconds to respond to the prompt. If the user does not respond, the alterations may be saved automatically, in some embodiments. If the user does respond to the prompt then the user may select an option to "view changes" or a like option. An indication of alterations to the document may then be presented. The alterations may be alterations between the version the user is currently working on and the version that had previously been saved. The alterations may be alterations between the version the user is currently working on and the last version that had been automatically saved. In various embodiments, a save operation that is initiated automatically may include a backup operation.

1.4. When something else forces the document to be closed—e.g., the user turns off the computer or the user closes the program. In various embodiments, the closure of a document may be initiated or caused by events other than a specific request to close the document. In various embodiments, a user may request to close a program. For example, a user may click an "x" icon in the upper right hand corner of Microsoft Word in order to request that the Microsoft Word program be closed (e.g., terminated). Such a request may have the consequence of closing any documents currently being displayed, edited, or otherwise in use by the program. For example, closing Microsoft Word may have the effect of closing any documents currently being edited in Microsoft Word. In various embodiments, when there is a request to close a program which is being used to view, edit, or otherwise operate on a document, a prompt may appear asking a user whether the user would like to view changes made to the document.

In various embodiments, the closure of a document may be initiated or caused by a request to shut down a computer (e.g., a personal computer; e.g., a handheld computer). For example, a document may be open for editing on a computer. When the computer is shut down (e.g., when the power to the computer or to one or more components of the computer is cut off) then the version of the document currently being worked on by a user may be lost or destroyed as an automatic consequence. In various embodiments, when a request to shut down a computer has been received, a prompt may be displayed asking whether the user would like to view changes that have been made to a document (e.g., to a document that is currently open). If the user indicates that he does wish to view changes (e.g., by clicking on a button on the prompt), then an indication of alterations made may be presented to the user. The user may then have the opportunity to save the alterations or to not save the alterations. Once the user has made his choice, the shutting down of the computer may proceed.

1.5. During an automatic shut down. (E.g., program has encountered an error and must close). In various embodiments, a computer may shut down automatically. For example, a computer may be set or programmed to shut down when it has not been used for more than a predetermined period of time. If a document is being edited or otherwise used on the computer, then the document may be closed automatically as a consequence of the computer shutting down. In various embodiments, when a computer initiates a process of shutting down, and a document is open then a prompt may be displayed for the user asking the user whether the user wishes to view changes made to a document.

2. What are the options to display? When a prompt is displayed, various options may be displayed. For example, a prompt may be displayed for the user asking the user whether he would like to save changes. The user may then have various options to respond to the question.

2.1. Save Changes, Don't Save Changes, Show Changes. In various embodiments, an option available to the user may be to save changes. If the user selects this option (e.g., by clicking), then alterations to the document the user is working on may be saved. In various embodiments, an option available to the user may be to not save changes. If the user selects this option, then alterations to the document the user is working on may be discarded or allowed to be lost. In various embodiments, an option available to the user may be to view the alterations that have been made to the document. If the user selects this option, then alteration which have been made to the document may be displayed or otherwise presented to the user.

2.2. Receive recommendation. In various embodiments, an option available to the user may be to ask for a recommendation (e.g., to ask for a recommendation from the computer as to whether or not the user should save the changes). If the user selects this option then the computer may recommend to the user to either save the alterations or not to save the alterations to the document. The computer may also provide an explanation. For example, the computer may display a message which says that since only one character changed and the added character created a misspelling, it was likely the change was made in error and therefore should not be saved.

2.3. View summary information about changes. In various embodiments there may be options available to the user to view summary statement or statistics about alterations made. A user may have the option to view information regarding the number of changes made, the time that changes were made, the portion of the document in which changes were made (e.g., "all changes were made on page 4"), and any other descriptive information about alterations made.

2.4. Save changes under a different document name In various embodiments, an option available to the user may be to save changes, but in a separate document. If the user selects this option, the version of the document the user is currently working on may be saved. However, in various embodiments, the version may be saved under a different name. Thus, for example, if a user is working on a document called "Market Segmentation" then the version of the document that the user is currently working on may saved under the name "TempDoc Market Segmentation". By saving the document in such a manner, the user may have the option of deciding later whether or not to begin working from the previously saved version of the document "Market Segmentation" or the document with the latest alterations, "TempDoc Market Segmentation."

2.5. Highlight changes that are to be saved. In various embodiments, an option available to a user may be an option to view the changes that are to be saved should the user choose to save the changes. This option might cause the changes to be highlighted in a view of the document, to be underlined in a view of a document, to be shown in strikethrough, or to be shown or displayed or presented in any other fashion.

3. What happens when you select "view changes"?

3.1. You can simply type ok after viewing the changes and then go back to the original dialogue box. In various embodiments, a user may select an option to view alterations made to a document. Once those alterations have been presented, the user may have another option available to him The other option may be labeled "ok", "back" or in some other fashion. By selecting this option, the user may return to the original prompt where he once again has the option to save or not to save alterations made to the document.

3.2. You can save the changes from the new place, e.g., with a new dialogue box. In various embodiments, a user may select an option to view alterations made to a documents. A new prompt or dialog box may be presented to the user. Within the new prompt or dialog box, the user may have the option of saving changes. For example, an option may be labeled "accept changes", "save", or with any other pertinent label. The new prompt or dialog may also, in various embodiments, include the changes that the user had opted to view.

4. How to show the changes. In various embodiments, alterations made to a document may be presented in various ways.

4.1. The two versions of the document may be shown in full. In various embodiments, two versions of a document may be shown in full. The first version may represent a version currently being worked on, such as a version that is stored in random access memory. A second version may represent a version that had previously been saved, such as a version stored on a computer hard drive. By viewing both documents in full, a user may, in principal, be able to deduce the differences between the two documents. In some embodiments, the documents may be shown in adjacent windows, with like text lined up. In this way, the user may be able to scan through both documents in order to look for places where text (or other objects) do not correspond perfectly.

4.2. What was added, and what was deleted may be shown. In various embodiments, items that have been added to a document may be indicated. For example, a window may display only text, graphics, or other objects which have been added to a document. In various embodiments, context for the additions may be shown. For example, line and page numbers may be shown, surrounding preexisting text may be shown (e.g., text that was already there before the changes were added may be shown), and any other context may be shown. In various embodiments, items which have been deleted from a document may be indicated. For example, a window may display only text, graphics, or other objects which have been deleted. For deleted items, context may also be shown. For example, the text surrounding deleted text may be shown. In various embodiments, added or deleted items may be marked in particular ways. Added items may be underlined or otherwise marked. Deleted items may be shown in strikethrough or otherwise marked. In various embodiments, when an item is moved within a document (e.g., when a paragraph is cut from one portion of the document and pasted in another portion of the document), the alteration shown to the document may include a deletion and an addition. The deletion correspond to the deletion of the item from its initial position, and the addition may correspond to the addition of the item to its final position.

4.3. A verbal description of the changes. In various embodiments, a verbal description of alterations to a document may be made. For example, a computer synthesized voice may read the text that has been added to a document. A verbal description may include a summary or qualitative description. For example, a synthesize voice may say that a graphic has been added without specifically describing all shapes and colors within the graphic.

4.4. The time the changes were made. In various embodiments, the time of one or more alterations may be presented. For example, an indication of a sentence that was added to a document may be shown, along with an indication of a time and date. The time and date may be shown in a different color or font from the sentence itself so as to indicate that the indication of the time is not part of the addition.

4.5. Highlights of the changes. In various embodiments, alterations may be shown in highlighted form. For example, text that has been added to a document may be shown in a block of yellow. As will be appreciated, many other methods may be used to distinguish changes. For example, underlining, italicization, bolding, changing the font size, changing the color, changing the gray scale, or any other suitable method may be used for distinguishing changes. Changes of addition or of deletion may be distinguished, e.g., with highlighting. I 4.6. Were there any changes made at all? In various embodiments, an indication may be provided as to whether there were any alterations made to a document. For example, the computer may display a message saying, "There were changes," or a message saying, "There were no changes made."

4.7. How many changes were made? In various embodiments, an indication may be provided as to how many changes were made to a document. The number of changes may be determined based on the number of characters added. The number of changes may be determined based on the number of characters deleted. For example, the number of changes reported may be equal to the number of characters added plus the number of characters deleted. In various embodiments, the number of changes may be determined based on the number of words added. In various embodiments, the number of changes may be determined based on: (a) the number of words deleted; (b) the number of sentences added; (c) the number of sentences deleted; (d) the number of paragraphs added; (e) the number of paragraphs deleted; (f) the number of keystrokes made; (g) the number of graphics added; (h) the number of graphics deleted; (i) the number of formatting changes made; (j) the number of pages added; (k) the number of pages deleted; (l) the number of cells modified (e.g., in a spreadsheet program); (m) the change in size of the document (e.g., the change in the number of bytes required to store the file; e.g., the change in the number of characters stored in the file); or based on any other pertinent factor. As an example, a computer may display a message which says, "Forty changes were made to your document."

4.8. Qualitative differences. In various embodiments, alterations made to a document may be described qualitatively.
    4.8.1. The number of pages before and after the change may be described. In various embodiments, an indication may be provided as to the proportion of a document that occurs before a change, and the proportion of the document that occurs after the change. For example, an indication may be provided as to the number of words, paragraphs, pages, or cells before a change, and the number of words, paragraphs, pages or cells after a change.
    4.8.2. The number of pages there were in the document before the change was made, and the number of pages there were in the document after the change was made. In various embodiments, the size of a document may be described before and after a change. The size of a document may be described in terms of words, pages, bytes, bits, paragraphs, cells, pixels, frames, or in terms of any other metric.

4.9. Modify the save procedure to add a pane to the dialog box. This way, you aren't really modifying code, you are just adding to it. In various embodiments, additions of code may be made to the save procedure which comes with a computer operating system, such as with Microsoft Windows. The additional code may create an extra portion of a prompt. The extra portion may be tacked onto a prompt that was hitherto created by the operating system. For example, the original prompt of the operating system may read, "Would you like to save changes to 'Document X'", with available options of "yes", "no", and "cancel". The extra portion may be tacked onto the original prompt, such as in a pane adjacent to the original prompt. In various embodiments, the additional pane may look like the portion indicated as 210 in FIG. 2.

4.10. A before and after, or an actual difference. E.g., when showing differences in images, you can subtract one pixel value from the other. In various embodiments, alterations in an image may be shown by showing both before and after versions of the image. In various embodiments, only portions of the image that have changed may be shown. For example, before and after versions of only 200 pixels out of 1000 pixels in an image may be shown. In various embodiments, the results of subtracting one image from another may be shown. For example, pixel values (e.g., pixel values as represented by numbers, such as 0 through 255) of a first version of an image may be subtracted from the pixel values of a second version of the image. The resulting difference may be displayed for each pixel. For example, a given pixel may have changed from having values of (200, 100 50) to having values of (100, 90, 30). Note that three values may correspond to a pixel, one for each primary color, in various embodiments. The difference in the value are thus (100, 10, 20). To illustrate the difference, a pixel may display the colors corresponding to (100, 10, 20).

5. Detection of accidental changes. In various embodiments, a determination may be made as to whether alterations to a document were most likely made accidentally or whether they were most likely made on purpose.

5.1. If changes appear to have been made accidentally, then recommend not saving. In various embodiments, if it is determined that changes made to a document were most likely accidental then a recommendation may be made that the changes not be saved. For example, a computer may present a message which says, "All changes appear to be accidental. Therefore, it is recommended that changes not be saved." In various embodiments, if it is determined that changes made to a document were most likely accidental then a document may be automatically closed without changes having saved. For example, a user may indicate a desire to close a version of a document even though unsaved changes exist. The computer may allow the version of the document to close without presenting a prompt if the computer determines that any changes made to the document were most likely accidental.

5.2. If changes appear to have been made on purpose, then recommend saving. In various embodiments, if it is determined that alterations made to a document were most likely made intentionally, then it may be recommended that alterations be saved. For example, a computer may display a message saying, "Changes appear to be intentional. Therefore, it is recommended that changes be saved."

5.3. Few key strokes. In various embodiments, if alterations are based on less than a predetermined number of user inputs (e.g., less then 3 key strokes; e.g., less than two movements of the mouse), then it may be determined that changes made to a document were most likely accidental. For example, it may assumed that a relatively small number of user inputs could have occurred accidentally (e.g., a user could have accidentally hit a few keys with his elbow.)

5.4. Deletion of large portions of text. In various embodiments, if alterations consist of deletions of significant portions of a document (e.g., one paragraph or more; e.g., one page or more), then such alterations may be determined to be accidental. It may be assumed, for example, that a user would not intentionally want to delete large portions of a document that he had put so much work into.

5.5. Nonsensical letters. In various embodiments, if alterations consist of nonsensical sequences, such alterations may be determined to be accidental. For example, the addition of the text, "abfweo" may be considered to be accidental since the text does not correspond to any known word or name.

5.6. Improper punctuation. In various embodiments, if alterations consist of sequences of improperly punctuated words or sentences, then such alterations may be considered to have occurred accidentally.

6. Interacting with the operating system 6.1. Modifying the API provided by the operating system.

6.2. Creating an alternate module to the one provided by the API for performing the save function.

In various embodiments, a user may save one or more versions of a document. The versions may represent a progression. For example, each version may represent a portion of a book that has so far been completed. Each newer version may incorporate everything from the previous version plus additions. Each version may represent a version of a document with which a user is satisfied. In various embodiments, the versions of a document may be ordered in some way. In various embodiments, versions of a document are ordered according to the dates at which they were saved (e.g., according to the dates when the versions were last saved; e.g., according to the dates when the versions were first saved). Different versions of the document may be named according to a convention. For example, the document may have a base name, such as "Document X" to which are appended version designations, such as "v1", "v2", "v3" and so on. Thus, a first version of the document may be called "Document X v1", a second version may be called "Document X v2", and so on. The naming of documents may occur automatically. For example, any time a user indicates he is happy with a version of the document, the version may be saved and given a new version number. In various embodiments, a user may be given the option of viewing alterations made to a version of the document he is currently working on as compared with any of the prior versions of the document. For example, the user may have the option of viewing alterations made to a version of "Document X" he is currently working on since "Document X v1", since "Document X v2" or since any other version of "Document X". In various embodiments, the user may select in a prompt an option to "view changes". The user may then have the further option, either in the same or in a new prompt, to select the version of the document that will serve as the basis of comparison for determining alterations.

In various embodiments, a user may be able to select a paragraph or other portion of a document. For example, a user may be able to put his mouse over a paragraph. Once a portion of the document has been selected, the user may be able to view prior versions of that portion of the document. Prior versions of that portion may include portions corresponding to the selected portions, but existing in prior versions of the document. For example, when a user puts his mouse over a paragraph, the user may be able to view prior versions of that paragraph.

In various embodiments, a prompt may ask a user whether he would like to see the changes that have been made to a document. For example, the prompt may read "Would you like to see the changes made to this document?" The prompt may occur in the absence of any prompt asking the user whether or not he would like to save changes made to the document.

In various embodiments, a list, sequence, or other enumeration of alterations made to a document may be presented. For example, upon indicating a desire to close a document, a user may be prompted with the question of whether or not he wishes to save changes made to the document. If the user responds in the affirmative then the list of changes may be presented to the user. The user may proceed through the list one at a time. For example, the user may highlight one change at a time. The user may decide, for each individual change, whether or not to save it. In various embodiments, the user may decide to save all changes at once. For example, there may be a clickable button labeled "save change". Clicking such a button may allow the user to save the change that is currently highlighted. There may be another button that is labeled "save all" or the like. Clicking the button may allow the user to save all changes at once.

As used herein, a computer touchpad may include any touch sensitive interface to a computer, where such interface may be capable of detecting the motion of objects (e.g., fingers) with which it is in contact, and translating such motions into computer commands (e.g., into the motions of a mouse pointer).

In various embodiments, a joystick may serve as an input device to a computer. In various embodiments, a trackball may serve as an input device to a computer.

Further Embodiments

The following should be interpreted as embodiments, not claims.

A1. A method comprising:
determining a first version of a document;
receiving a first set of instructions;
determining a second version of the document based on the first version and the first set of instructions;
receiving a second set of instructions, the second set of instructions directing that the first version of the document be discarded;
displaying, after receiving the second set of instructions, a set of options, the options comprising:
a first option to discard the first version of the document;
a second option to discard the second version of the document;
a third option to view a comparison of the first version of the document with the second version of the document;
receiving an indication of a selection of one of the three options;
discarding the first version of the document if the first option has been selected;
discarding the second version of the document if the second option has been selected; and
displaying the view of the comparison of the first version of the document with the second version of the document if the third option has been selected.

A2. The method of A1 in which the document is one of:
(a) a word processing document;
(b) a spreadsheet document;
(c) an image;
(d) a drawing;
(e) a computer aided design file;
(f) an audio file; and
(g) a text document.

A3. The method of A1 in which the second version of the document is a version of the document which is currently being displayed on a computer.

A4. The method of A1 in which the first version of the document is a version of the document which has previously been saved.

A5. The method of A1 in which the first set of instructions include instructions from one of:
(a) a keyboard;
(b) a computer mouse;
(c) a computer touchpad;
(d) a trackball; and
(e) a joystick.

A6. The method of A1 in which the first set of instructions includes instructions for making alterations.

A7. The method of A1 in which the second set of instructions includes instructions to close the first version of the document.

A8. The method of A1 in which the second set of instructions includes instructions to close a program which is being used to edit the first version of the document.

A9. The method of A1 in which the second set of instructions includes instructions to shut down the computer on which the document is being edited.

A10. The method of A1 in which displaying, after receiving the second set of instructions, a set of options includes: displaying, after receiving the second set of instructions, a set of clickable buttons, the buttons representing:
a first option to discard the first version of the document;
a second option to discard the second version of the document; and
a third option to view a comparison of the first version of the document with the second version of the document.

A11. The method of A10 in which receiving an indication of a selection of one of the three options includes receiving an indication of which of the clickable buttons the user has clicked on.

A12. The method of A1 in which displaying the view of the comparison includes displaying text that is present in the second document and not present in the first document with an underline font.

A13. The method of A1 further comprising:
displaying, after receiving the second set of instructions, a message, the message asking whether a user wishes to save changes to the document.

A14. The method of A1 in which:
the first option is presented as a button labeled "Yes";
the second option is presented as a buttoned labeled "No"; and
the third option is presented as a button labeled "View Changes".

A15. The method of A1 in which displaying the view of the comparison includes displaying a list of distinct changes made between the first version of the document and the second version of the document if the third option has been selected, the method further including:
receiving an indication that a subset of the list of distinct changes has been selected;
receiving an instruction to save all selected changes; and
saving the subset of the list of distinct changes.

A16. The method of A1 in which determining a first version of a document includes:
displaying a plurality of versions of a document, each version having been previously saved by a user and provided with a distinct version identifier;
receiving a selection of one of the plurality of versions, thereby determining the first version.

A17. A method comprising:
receiving an indication that a user wishes to close a second version of a document;
determining whether the second version of the document has been saved;
presenting, if the second version has not been saved, a prompt asking whether the user wishes to save changes, the prompt including user selectable options to save changes, to not save changes, and to view changes;
determining the user's selection from among the selectable options; and
presenting, if the user has selected the option to view changes, an indication of changes made between the second version of the document and a first version of the document which has been previously saved.

A18. A method comprising:
receiving an indication that a user wishes to close a second version of a document;

determining whether the second version of the document has been saved; and presenting, if the second version has not been saved, a prompt asking whether the user wishes to view changes to the document.

A19. The method of A18 further including:

presenting an indication of changes made between the second version of the document and a first version of the document which has been previously saved.

What is claimed is:

1. A non-transitory computer-readable medium configured to store instructions that, when executed by at least one processor, control:
   detecting a request to close a document;
   determining whether the document comprises at least one change that has not been saved;
   based on the detecting and determining that the document comprises the at least one change,
      determining whether the at least one change has a characteristic indicating the at least one change was accidental based on (i) a number of user inputs causing the at least one change, (ii) at least a predetermined portion of the document being deleted by the at least one change, or (iii) the at least one change not corresponding to any of a plurality of predetermined text sequences, and
      when the at least one change is determined to have the characteristic, providing a prompt to save the document and, in conjunction with the prompt, a recommendation whether the at least one change should be saved, the prompt including an option to be presented with the at least one change;
   receiving a selection of the option which indicates a request to be presented with the at least one change;
   based on the receiving, displaying a comparison between a first version of the document and a second version of the document, the comparison indicating the at least one change, wherein the second version of the document is different from the first version of the document as a result of the second version of the document being altered;
   receiving in response to the displaying the comparison, a request to save the at least one change; and
   based on the request to save the at least one change, replacing the first version of the document which is stored in non-volatile memory with a version of the document that includes the at least one change from the second version of the document.

2. The non-transitory computer-readable medium of claim 1, wherein:
   the second version of the document includes at least one additional unsaved change from the first version that is different from the at least one change;
   the request to save the at least one change excludes the at least one additional unsaved change; and
   the version of the document that replaces the first version of the document excludes the at least one additional unsaved change.

3. The non-transitory computer-readable medium of claim 1, wherein the prompt is part of a dialog box that gives an option to save the at least one change.

4. A method comprising:
   controlling, by at least one processor:
   detecting a request to close a document;
   determining whether the document comprises at least one change that has not been saved;
   based on the detecting and the determining that the document comprises the at least one change,
      determining whether the at least one change has a characteristic indicating the at least one change was accidental based on (i) a number of user inputs causing the at least one change, (ii) at least a predetermined portion of the document being deleted by the at least one change, or (iii) the at least one change not corresponding to any of a plurality of predetermined text sequences, and
      when the at least one change is determined to have the characteristic, providing a prompt to save the document and, in conjunction with the prompt, a recommendation whether the at least one change should be saved, the prompt including an option to be presented with the at least one change;
   receiving a selection of the option which indicates a request to be presented with the at least one change;
   based on the receiving, displaying a comparison between a first version of the document and a second version of the document, the comparison indicating the at least one change, wherein the second version of the document is different from the first version of the document as a result of the second version of the document being altered;
   receiving, in response to the displaying the comparison, a request to save the at least one change; and
   based on the request to save the at least one change, replacing the first version of the document which is stored in non-volatile memory with a version of the document that includes the at least one change from the second version of the document.

5. The method of claim 4, wherein:
   the second version of the document includes at least one additional unsaved change from the first version that is different from the at least one change;
   the request to save the at least one change excludes the at least one additional unsaved change; and
   the version of the document that replaces the first version of the document excludes the at least one additional unsaved change.

6. The method of claim 4, wherein the prompt is part of a dialog box that gives an option to save the at least one change.

7. An apparatus comprising
   at least one processor configured to control:
   detecting a request to close a document;
   determining whether the document comprises at least one change that has not been saved;
   based on the detecting and determining that the document comprises the at least one change,
      determining whether the at least one change has a characteristic indicating the at least one change was accidental based on (i) a number of user inputs causing the at least one change, (ii) at least a predetermined portion of the document being deleted by the at least one change, or (iii) the at least one change not corresponding to any of a plurality of predetermined text sequences, and
      when the at least one change is determined to have the characteristic, providing a prompt to save the document and, in conjunction with the prompt, a recommendation whether the at least one change should be saved, the prompt including an option to be presented with the at least one change;
   receiving a selection of the option which indicates a request to be presented with the at least one change;

based on the receiving, displaying a comparison between a first version of the document and a second version of the document, the comparison indicating the at least one change, wherein the second version of the document is different from the first version of the document as a result of the second version of the document being altered;

receiving in response to the displaying the comparison, a request to save the at least one change; and based on the request to save the at least one change, replacing the first version of the document which is stored in non-volatile memory with a version of the document that includes the at least one change from the second version of the document.

8. The apparatus of claim 7, wherein:

the second version of the document includes at least one additional unsaved change from the first version that is different from the at least one change;

the request to save the at least one change excludes the at least one additional unsaved change; and the version of the document that replaces the first version of the document excludes the at least one additional unsaved change.

9. The apparatus of claim 7, wherein the prompt is part of a dialog box that gives an option to save the at least one change.

10. The non-transitory computer-readable medium of claim 1, wherein the prompt includes a "No" button for discarding the at least one change, a "Yes" button for saving the at least one change, and a "View Changes" button for being presented with the at least one change.

11. The non-transitory computer-readable medium of claim 1, wherein the at least one change includes a plurality of changes, and the comparison sequentially displays each of the at least one changes one at a time.

12. The method of claim 4, wherein the prompt includes a "No" button for discarding the at least one change, a "Yes" button for saving the at least one change, and a "View Changes" button for being presented with the at least one change.

13. The method of claim 4, wherein the at least one change includes a plurality of changes, and the comparison sequentially displays each of the at least one changes one at a time.

14. The apparatus of claim 7, wherein the prompt includes a "No" button for discarding the at least one change, a "Yes" button for saving the at least one change, and a "View Changes" button for being presented with the at least one change.

15. The apparatus of claim 7, wherein the at least one change includes a plurality of changes, and the comparison sequentially displays each of the at least one changes one at a time.

16. The apparatus of claim 7, in which the document comprises at least one of: (a) a word processing document; (b) a spreadsheet document; (c) an image; (d) a drawing; (e) a computer aided design file; (f) an audio file; and (g) a text document.

* * * * *